United States Patent [19]
Kranich

[11] Patent Number: 5,761,709
[45] Date of Patent: Jun. 2, 1998

[54] WRITE CACHE FOR SERVICING WRITE REQUESTS WITHIN A PREDETERMINED ADDRESS RANGE

[75] Inventor: Uwe Kranich. Munich, Germany

[73] Assignee: Advanced Micro Devices, Inc., Sunnyvale, Calif.

[21] Appl. No.: 464,352

[22] Filed: Jun. 5, 1995

[51] Int. Cl.[6] .................................................. G06F 12/08
[52] U.S. Cl. ........................ 711/122; 711/143; 711/144
[58] Field of Search ................................. 395/470, 447, 395/448, 449, 471

[56] References Cited

U.S. PATENT DOCUMENTS

| 5,197,144 | 3/1993 | Edenfield et al. | 711/143 |
| 5,325,499 | 6/1994 | Kummer et al. | 711/143 |
| 5,359,723 | 10/1994 | Mathews et al. | 711/143 |
| 5,502,828 | 3/1996 | Shah | 711/143 |
| 5,524,225 | 6/1996 | Kranich | 711/143 |

FOREIGN PATENT DOCUMENTS

| 0 325 420 | 7/1989 | European Pat. Off. . |
| 0 470 735 | 2/1992 | European Pat. Off. . |
| 0 602 807 | 6/1994 | European Pat. Off. . |
| 0 602 808 | 6/1994 | European Pat. Off. . |

OTHER PUBLICATIONS

Chen, Yung–Chin and Veidenbaum, Alexander V. "An Effective Write Policy for Software Coherence Schemes", IEEE Computer Society Press, 1992; pp. 661–72.

Anon., "Dynamic Memory Architecture Increases Performance of 486–Based Motherboards", Electronic Design, vol. 41, No. 15, Jul. 1993, pp. 36–38.

*Primary Examiner*—Eddie P. Chan
*Assistant Examiner*—Reginald G. Bragdon
*Attorney, Agent, or Firm*—Foley & Lardner

[57] ABSTRACT

A memory system has a level 1 cache and a write cache connected to a processor, wherein the write cache has a memory address range and wherein the processor initiates a write to the write cache which is detected by the write cache. The write cache responds to the write request by storing information into the write cache if the write cache is not already full. If there is no storage location available in the write cache, a message is sent to the level 1 cache notifying that cache of this condition. The write cache responds to requests from the processor to write information stored in particular areas of the write cache into a main memory by placing that information on a external bus to be read by the main memory. The write cache then frees up those storage locations within the write cache to be used for storing subsequent writes requested by the processor.

4 Claims, 3 Drawing Sheets

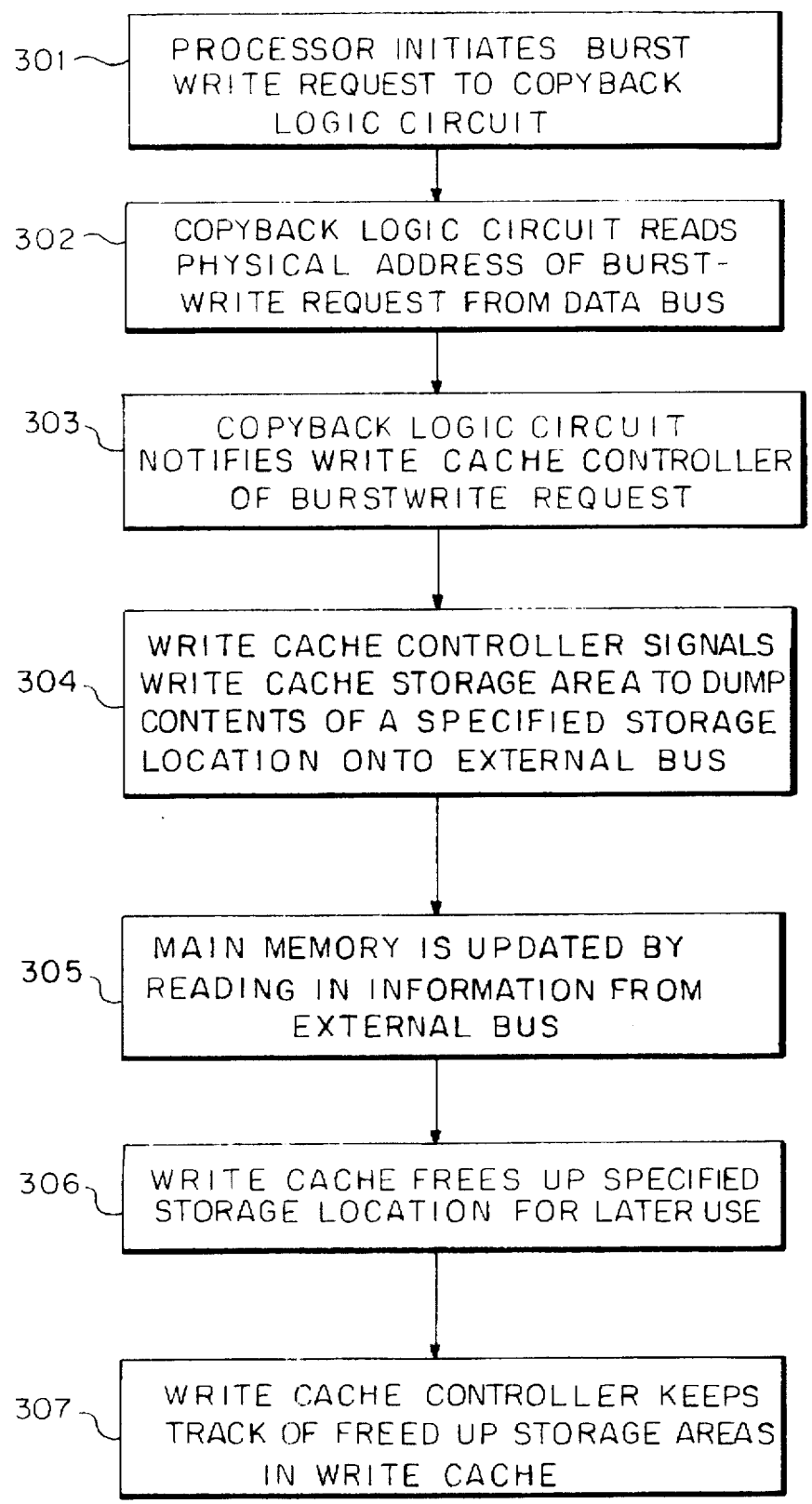

WRITE CACHE FOR SERVICING WRITE REQUESTS WITHIN A PREDETERMINED ADDRESS RANGE

BACKGROUND OF THE INVENTION

1. Field of The Invention

The invention relates to improving the efficiency of data transfer in a data processing system. In particular, a system according to the invention provides a write cache to support burstwrite capability.

2. Description of the Related Art

Conventional processing systems include a central processing unit (processor), a main memory, and in some systems, a cache memory between the processor and the main memory. High-speed, small-capacity cache memories hold portions of the information from the main memory that are used frequently by the processor in order to expedite memory fetch, thereby leaving more time for the processor to perform other functions.

The time required to supply a processor with required information may be decreased by lowering the time lapse between the memory's receipt of address information from the processor and the transmission of the required information back to the processor. This time lapse is determined by the "speed" of the memory. Since the cost of memory is directly related its speed, it is often not practical to use the fastest memory available, especially in processing systems which require large quantities of memory.

Using a relatively small bank of relatively high-speed memory, called cache memory, as a buffer for a larger bank of slower system memory improves the average information-request to information-supply speed. Specifically, in a system having a cache memory, the processor initially requests information it needs from the cache memory. If the information is stored in the cache memory, the request is said to be a "cache hit" and the information is provided to the processor from the cache memory at the faster rate. If the required information is not stored in the cache memory, the information request is said to be a "cache miss" and the information is retrieved from the system memory at the slower transfer rate. When the information is supplied to the processor from the system memory, a copy of the information can be stored in the cache memory in anticipation of subsequent requests for the same information by the processor.

In a processor architecture such as the 29K architecture, a plurality of n registers can be written as a burst in a burstwrite process. The information is stored internally without writing to an external bus. When it is necessary to transmit the information over a bus such as a graphics bus, access to the cache is necessary because the information is not in main memory. Cache access can be accomplished using a writeback or inquiry cycle in which multiple writes are sent in a single burstwrite.

Certain processing architectures, like the X86 architecture, do not support instructions to generate burstwrite accesses to an external bus that connects the processor to another memory, such as main memory. Instead, all writes initiated by software are simple writes. Burstwrites occur only during a cache replacement or a writeback of a modified line within the cache during snooping. These burstwrite cases are controlled by the cache itself and are not under software control. Thus, the application software does not initiate a burstwrite for a specific sequence of memory locations.

For certain applications, this inability to perform burstwrites is inefficient because it restricts the possible transfer rate between the processor and memory. One example is a graphics transfer, where very often sequential memory locations will be written into memory, with each memory location conforming to a pixel and adjacent memory locations corresponding to data concerning adjacent pixels for a graphics image. Repeatedly executing a simple write for each pixel is a highly inefficient use of system resources.

In a system according to the invention, as discussed further herein, rather than perform a simple write for each pixel, sequential pixels could be written into the cache using a burstwrite feature. The implementation of such a burstwrite feature in an X86 architecture would most likely improve bandwidth improvement by at least 50%. With this bandwidth improvement, the required bus bandwidth for these types of operations would be reduced, resulting in a corresponding increase in performance by the processing system.

SUMMARY OF THE INVENTION

In view of the limitations of the related art, as discussed above, it is an object of the invention to provide a mechanism to support a burstwrite, even if the software architecture, such as the X86 architecture does not support a burstwrite feature.

The above and other objects of the invention are achieved by system according to the invention which includes a processor, a first level cache (level 1) cache operatively connected to the processor and a main memory, and a write cache operatively connected to the processor, the level 1 cache, and the main memory. The write cache detects a write request from the processor and receives a command from the level 1 cache indicating whether the level 1 cache will service the write request. If the command received from the level 1 cache indicates that the level 1 cache will not service the write request, the write cache compares a memory address on an internal address bus corresponding to the write request to a prespecified range of addresses within the write cache. If the memory address is within the prespecified range, the write cache stores data from an internal data bus and the memory address on the internal address bus into the write cache.

In another aspect according to the invention in a processing system as above the write cache detects a burstwrite request from the processor. The write cache outputs information corresponding to a storage location within the write cache that matches a tag address corresponding to the burstwrite request. The tag address is read by the write cache from the internal data bus, and the write cache outputs the information onto an external bus for output to the main memory.

Further according to the invention, a memory system includes a processor, a level 1 cache operatively connected to the processor and a main memory, and a write cache operatively connected to the processor, the level 1 cache and the main memory. The write cache includes a write cache controller operatively connected to the processor and the level 1 cache. The write cache controller detects write requests from the processor. Upon receipt of such a write request, the write cache controller receives a first command from the level 1 cache signifying whether the level 1 cache will process the write request. The write cache controller sends a second command to the level 1 cache signifying whether the write cache will process the write request. The write cache also includes a write cache storage area operatively connected to the write cache controller and connected to the main memory over an external address and data bus. The write cache storage area includes a plurality of storage locations for storing information. The write cache also has an address comparator operatively connected to the processor and the write cache controller. The address comparator compares an address on an internal address bus to a prespecified address range within the address comparator. The address comparator notifies the write cache controller when the address read from the address bus is within the prespecified address range. The write cache also includes a copyback logic circuit operatively connected to the processor, the write cache controller, and the write cache storage area. The copyback logic circuit detects a burstwrite request from the processor. Upon receipt of such a burstwrite request, the copyback logic circuit notifies the write cache controller of the burstwrite request. The copyback logic circuit stores an address corresponding to the burstwrite request from an internal data bus, and the copyback logic circuit sends the address corresponding to the burstwrite request to the write cache storage area.

In another aspect according to the invention, the write cache storage area has a status field for each of the plurality of storage locations within the write cache storage area. The status field signifies whether or not information held in a storage location has been sent to the main memory in response to a burstwrite request from the processor. The write cache controller checks the status fields to determine if any of the storage locations can store information corresponding to the write request from the processor.

In another aspect of the invention a memory system as described above further includes a write cache available notification means in the write cache controller for determining if the write cache can service the write request from the processor.

The other purposes, characteristics and efficiencies of a system according to the invention will be clear by the following detailed descriptions.

BRIEF DESCRIPTION OF THE DRAWINGS

The invention, together with further objects and advantages thereof, may best be understood by making reference to the following description taken in conjunction with the accompanying drawing, in the figures included, and wherein:

FIG. 3 is a flow diagram of the sequence involved in a burstwrite of a line to an external bus according to the invention in order to get data out from the cache.

DETAILED DESCRIPTION OF THE PREFERRED EMBODIMENTS

Figure 1:
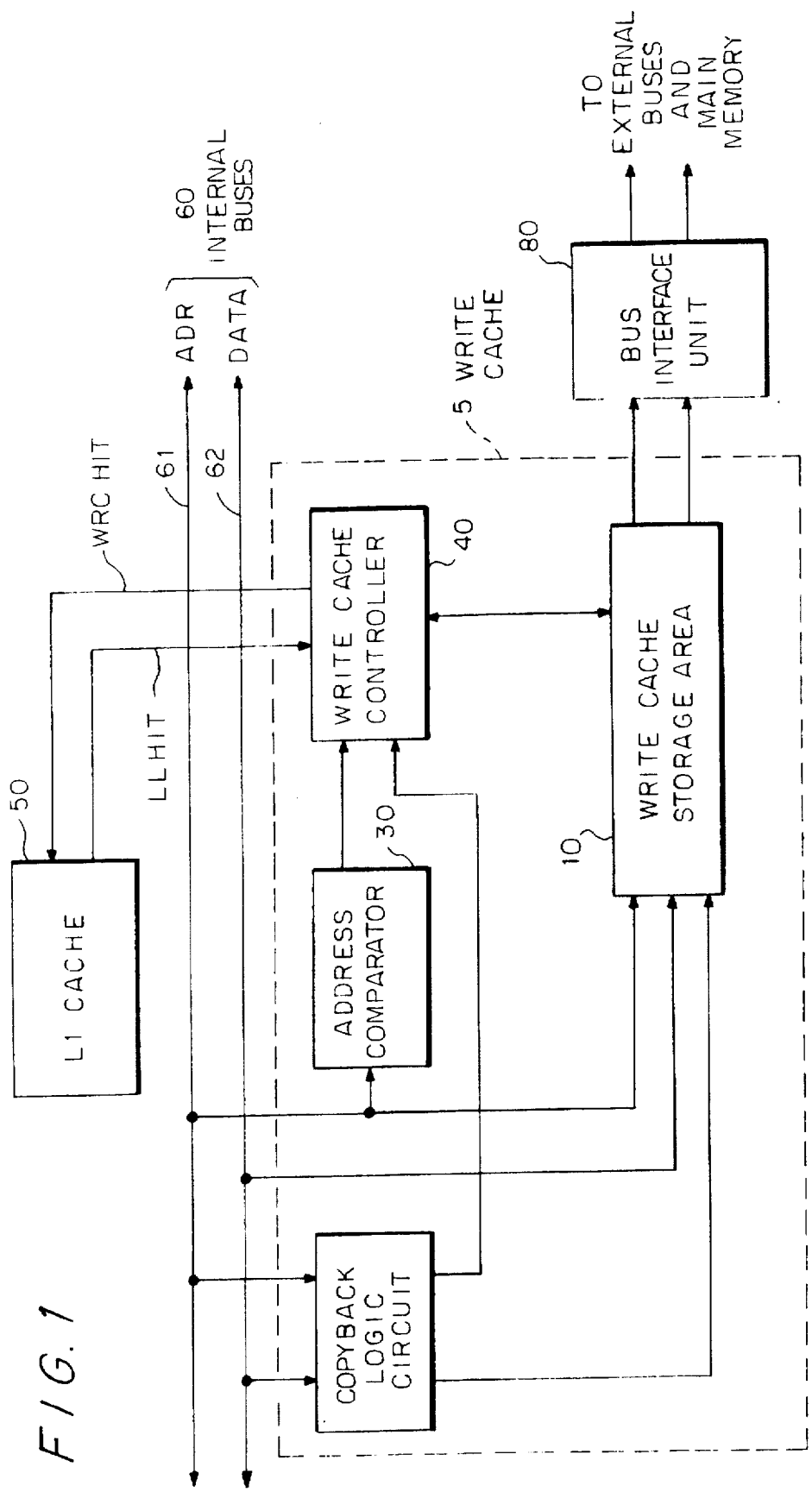
FIG. 1 is a block diagram of the elements of a write cache architecture according to the invention.

Referring to FIG. 1, a write cache 5 includes write cache storage area 10, copyback logic circuit 20, address comparator 30, and write cache controller 40. A level 1 (L1) cache 50 is connected to the write cache 5 over internal buses 60, which include an internal address bus 61 and an internal data bus 62. Both the level 1 cache 50 and the write cache 5 are connected to a processor (not shown) over the internal buses 60. Cache storage can be organized as lines, each line having a plurality of words. An address of a first word in a line can represent the address of the line. One way that burstwrites can be facilitated is by indicating the address of a line of words to be the subject of a burstwrite.

As previously discussed, in X86 architectures, burstwrites are controlled by the cache itself and are not under software control. Thus, the application software does not initiate a burstwrite for a specific sequence of memory locations. In order to provide compatibility with software for existing X86 architectures, the write cache 5 according to the invention is preferably enabled only for a specific memory region. In this way, processor software can be written to take advantage of the write cache 5 in desired applications, such as a graphics implementation or disk accelerator. In those cases, specific software routines, which can be changed to take advantage of the write cache features, are implemented without having an impact on the other processor software. However, it will be understood by those of ordinary skill that restriction to a predetermined region of memory is a limitation of the invention.

Referring again to FIG. 1, the write cache controller 40 controls all of the functions of the write cache 5 and interfaces with the level 1 cache 50. The write cache storage area 10 stores data, a tag address for the data, and a status indication for the data. The write cache storage area 10 is under control of the write cache controller 40.

The address comparator 30 compares an address received on the internal address bus 61 with a predetermined address range stored within the address comparator 30. If the address received on the internal address bus 61 falls within the predetermined address range, the address comparator 30 sends a signal to the write cache controller 40 indicating this "address range hit".

The copyback logic circuit 20 generates a request to the write cache controller 40 to copy a line corresponding to a specific address from the write cache storage area 10 to the external buses (not shown) upon detecting a burst write command from the processor. As discussed further herein, the physical address of the line to be copied back is written into the copyback logic circuit 20. The logic itself is selected by a specific address. During a write on the external buses, the copyback logic circuit 20 detects a write to a location and latches the physical address of the line to be copied back from the internal data bus 60. The copyback logic circuit 20 then indicates to the write cache controller 40 that a copyback needs to be initiated.

The write cache 5 only works on writes by the processor. When a read occurs, no operations are performed by the write cache 5. According to the invention, when a processor, such as a core CPU, initiates a write, the write cache controller 40 sees this write access and starts a cache look up to determine if the address corresponding to the write access is currently in the write cache storage area 10. Concurrently and in parallel, the address comparator 30 reads the address corresponding to the write access from the internal address bus 61 and determines if that address falls within a prespecified range of addresses for which the write cache 5 is programmed. At the same time that write cache 5 is acting on the write access request from the processor, the level 1 cache 50 is also looking to see if it can service that write access.

Figure 2:
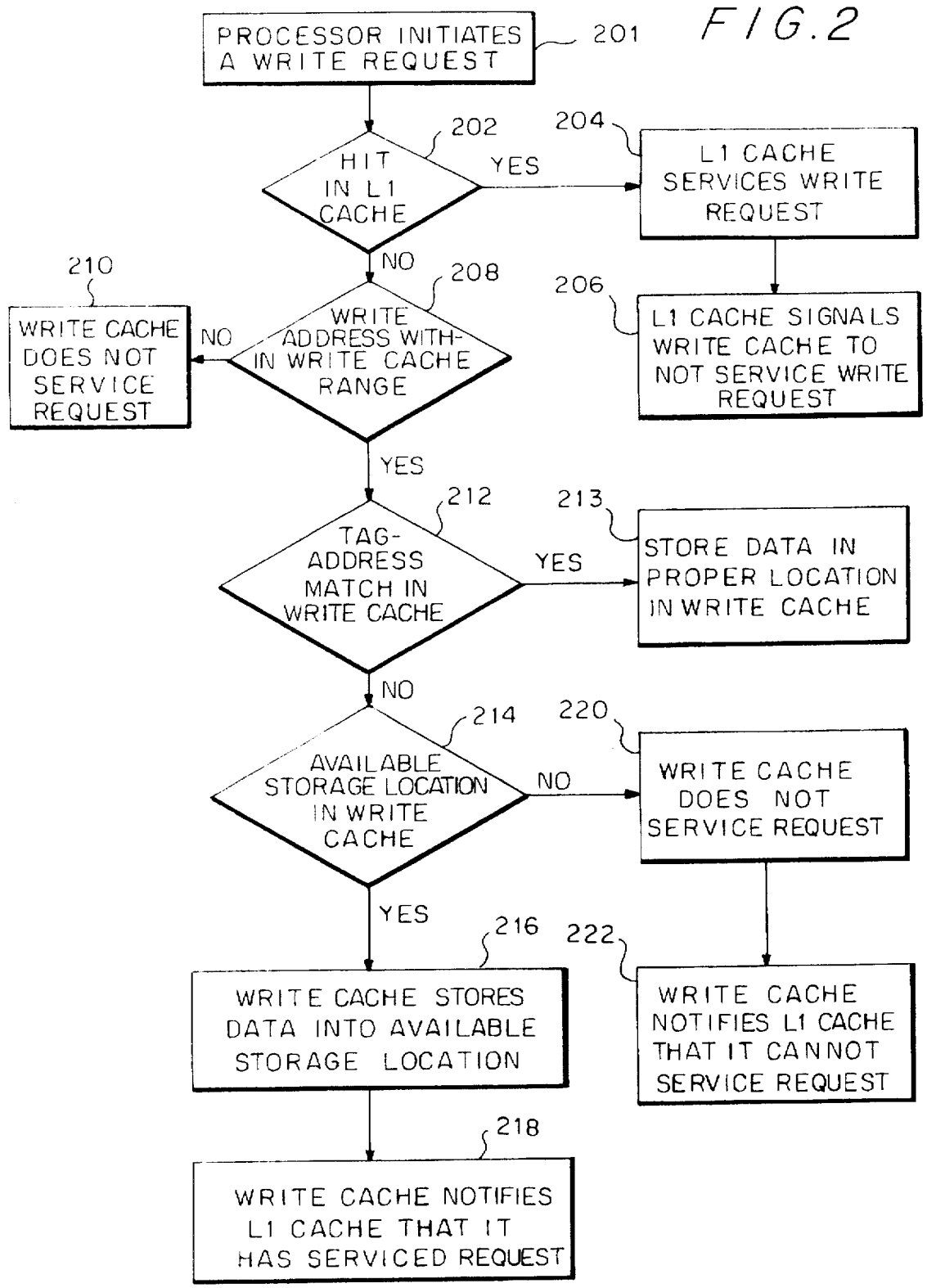
FIG. 2 is a functional flow diagram of the write sequence from a processor in a cache system with a level 1 cache and a write cache, according to the invention.

Referring now to the functional flow diagram in FIG. 2, in step 201 a processor initiates a write request. As noted above, in response to this write request, the write controller 40 begins a cache look up and an address range comparison. In parallel, level 1 cache 50 also begins a cache look up. Several outcomes are possible. One possibility is that the level 1 cache 50 has a cache hit, as in step 202. If this is the case, the write request access address is resident in the level 1 cache 50 and the level 1 cache 50 services the request (step 204). No further operation is required of the write cache controller 40, and the sequence ends, as in step 206. When the level 1 cache 50 has a cache hit, the level 1 cache 50 notifies the write cache 5 of this occurrence by sending a L1__Hit signal to the write cache controller 40, as can be seen from FIG. 1. Upon receipt of the L1__Hit signal, the write cache 5 knows that it is not to perform any further operations with respect to the write request.

Another possibility is that the level 1 cache 50 has a cache miss (i.e., no L1__Hit signal received by the write cache controller 40) and the requested write address, as determined by the address comparator 30, is not within the selected address region of the write cache 5, as shown in step 208 of FIG. 2. In this case, no further operation is required of the write cache controller 40, and the sequence ends, as in step 210.

If the requested write address is within the range of addresses in the write cache 5, step 212 is performed. In step 212, the write request is tested to determine if any of the tag addresses in the write cache 5 matches the request. This leads to third and fourth possible outcomes.

The third possible outcome is that the level 1 cache 50 has a cache miss (step 202), the requested write address, as determined by the address comparator 30, is within the selected address region of the write cache 5 (step 208), and the result of step 212 is that the write access hits the write cache 5. In this case, the write access is stored in the appropriate storage area corresponding to the selected line in the write cache storage area 10, as in step 213. No external simple write is generated in this case.

The fourth possibility is that the level 1 cache 50 has a cache miss, the write access, as determined by the address comparator 30, is within the selected address region of the write cache 5, but that the outcome of step 212 is such that the write access does not hit the write cache 5. In this case, in step 214 the write cache is examined to determine if at least one storage area in the write cache storage area 10 is available to store the write access. Two outcomes are now possible.

If a write cache storage location is available, the write data and write address are stored in the write cache 5 in an available storage area of the write cache storage area 10, as in step 216. In step 218, the write cache controller 40 notifies the level 1 cache 50 that it stored the data corresponding to the write access. In this case, no external simple write, such as to the main memory, is generated.

Alternatively, if the level 1 cache 50 has a cache miss (step 202), and the write access, as determined by the address comparator 30, is within the selected address region of the write cache 5 (step 208), and the write access does not hit the write cache 5 (step 212), and the outcome of step 214 indicates that there are no available storage locations in the write cache storage area 10, the write cache 5 does not store the write access in its memory (step 220). The write cache 5 notifies the level 1 cache 5 that it did not service the write access, as in step 222, for example, by sending a no hit signal to the L1 cache.

In those of the above steps in which information is stored in the write cache, it should be noted that in addition to the data conventionally written in a cache, a plurality of bits, e.g., four bits per word, can be used to define which byte was written or modified. This is useful to avoid sending invalid data, as discussed further herein.

After the writes have been placed into the write cache 5, software executing on the processor may want to initialize a burstwrite of data beginning at a specific address to the external bus. Referring now to FIG. 3, the processor software initiates a single write to a copyback address register (not shown) in copyback logic circuit 20, as given in step 301 and places the physical address of the line to be copied on the internal bus. As previously discussed, the copyback logic circuit 20 itself is selected by a specific address. From the internal data bus 62, as given in step 302, the copyback address register 20 reads and latches the physical address of the write location (line) to be copied back.

Next, the copyback logic circuit 20 notifies the write cache controller 40 of the burstwrite request from the processor, as given in step 303. The write cache controller 40 responds to that burstwrite request by placing the selected line of the write cache 5 corresponding to the requested copyback access onto the external buses for a fast burstwrite, as given in step 304. After the information has been dumped onto the external buses for transfer to main memory, as given in step 305, the storage locations in the write cache storage area 10 that were dumped onto the external buses are freed up for the storage of new write requests from the processor, as given in step 306. The write cache controller 40 keeps track of the available storage locations within the write cache 5, as given in step 307.

According to the invention, the L1 cache 50 performs the functions of a conventional cache memory and is not affected at all by the operation of the write cache 5. During write requests, the results of the address comparisons activate the functionality of the write cache 5 for a particular memory region. Address comparisons are performed in a processor or logic circuits within address comparator 30 implementing this function. Within the write cache module 5, the write cache controller 40, which can be implemented in logic circuitry or in a processor, controls buffering and informs the L1 cache 50 that it need not respond to a particular write request by sending a signal over the WRC__ Hit Line connecting the L1 cache 50 to the write cache controller 40. For example, the write cache controller 40 can store information in a frame buffer memory for a video graphics accelerator, where one address of the frame buffer is followed by a plurality of data words or bytes to be sequentially transmitted in a burst in order to produce a display. The copyback logic circuit 20, which can also be implemented in logic circuitry or in a processor, is used to execute a burstwrite.

The write cache 5 according to the invention is particularly useful in applications where streams of sequential data are written to memory. For example, a display driver can be written to draw four adjacent horizontal pixels. After four writes are performed into the write cache 5 without going to the external buses, the driver determines that it has completed its writes to the write cache 5 (assuming the write cache 5 is not full). In order to provide a burstwrite of the data to the external buses in order to produce the display, a copyback is initiated through the copyback logic circuit 20. A complete address corresponding to a tag address is written into the copyback logic circuit 20. The tag address is the address of the data in the write cache 5 which is to be put on the external buses to accomplish the drawing. Thus, the copyback logic circuit 20 retrieves from the internal bus 60 the address of the data to be sent to the bus interface unit 80 connected to the external buses, to thereby be sent to a particular address in the main memory (not shown) at a later time.

Since the data is sequential, a single burstwrite cycle can transfer the information. For example, if line 1000 contains 16 bytes, addresses 1000 through 1015 are accessed as a burst. Thus, where all the pixels in one line are stored in sequential locations 1000 through 1015, it is only necessary to write address 1000 to the copyback logic circuit 20 to place all the data in locations 1000 through 1015 on the external bus to produce the display. Such a burstwrite, which can be achieved according to the invention, is far more efficient than a series of conventional individual writes. Moreover, according to the invention, all writes can be stored in cache by using sequential writes in software, thus reducing the load on the cache.

It is to be understood that the detailed drawings and specific examples given describe preferred embodiments of the invention and are for the purpose of illustration, that the apparatus and method of the invention is not limited to the precise details and conditions disclosed, and that various changes may be made therein without departing from the spirit of the invention which is defined by the following claims.

What is claimed is:

1. A method for improving memory write performance in a processing system having a write cache which includes a plurality of storage locations and a first cache, the method comprising the steps of:
   a) receiving a data write command which includes data and a memory address to write said data to; and
   b) determining if said memory address is within a prespecified address range for the write cache, and if said memory address is within said prespecified address range:
      i) determining if any of said storage locations are available for storing said memory address and said data corresponding to said memory address, and if there is at least one available storage location:
         A) storing said data corresponding to said memory address in said at least one available storage location;
         B) updating an availability status for each of said storage locations, and
         C) writing said memory address and said data corresponding to said memory address on a respective external address bus and an external data bus upon receiving a burstwrite command which indicates that said memory address is to be written out, wherein the step b) is only performed when said memory address corresponding to said data write request does not reside in said first cache.

2. A method as recited in claim 1, wherein said memory address and said data corresponding to said memory address are written out to a main memory connected to said external address bus and said external data bus.

3. A method as recited in claim 1, wherein in the step b), said memory address is compared with a maximum address value and a minimum address value, and when said memory address is both greater than said minimum address value and less than said maximum address value, said memory address is determined to be within said predetermined range, otherwise said memory address is determined to be outside said predetermined range.

4. A method as recited in claim 1, further comprising the step of:
   D) sending a write cache hit signal to said first cache when said write cache writes said data corresponding to said memory address into said write cache.

* * * * *